United States Patent
Biswas

(10) Patent No.: US 8,078,105 B2
(45) Date of Patent: Dec. 13, 2011

(54) SCROLL WHEEL ON HINGE

(75) Inventor: Saikat Biswas, Turku (FI)

(73) Assignee: Kyocera Corporation, Kyoto (JP)

( * ) Notice: Subject to any disclaimer, the term of this patent is extended or adjusted under 35 U.S.C. 154(b) by 419 days.

(21) Appl. No.: 12/416,146

(22) Filed: Mar. 31, 2009

(65) Prior Publication Data

US 2010/0248778 A1  Sep. 30, 2010

(51) Int. Cl.
*H04B 7/00* (2006.01)

(52) U.S. Cl. .................. 455/41.2; 455/575.1

(58) Field of Classification Search ............ 455/41.2, 455/575.1, 575.3, 575.4, 575.7, 575.8, 556.1, 455/566, 90.3, 186.2, 550.1, 550, 90, 403; 45/418; 379/433.13, 433.04, 433.11, 434
See application file for complete search history.

(56) References Cited

U.S. PATENT DOCUMENTS

| 7,162,030 B2 | 1/2007 | Bell et al. |
| 2002/0137551 A1* | 9/2002 | Toba .................... 455/566 |

* cited by examiner

*Primary Examiner* — Joseph Lauture

(57) ABSTRACT

A scroll wheel hinge assembly for an electronic device is described. The scroll wheel hinge assembly may be used for an electronic device that pivotally connects a flip module with a base module having a keypad. The flip module has a front face with an internal display and a back face with an external display. The hinge assembly includes a cylindrical rotatable assembly, a flip-closed position, and a flip-open position. More particularly, the cylindrical rotatable assembly is configured to enable the flip module to rotate in relation to the base module about a rotatable axis associated with the cylindrical rotatable assembly. The cylindrical rotatable assembly also includes either a free-wheel or a touch sensitive component on the exterior of the cylindrical assembly. In the illustrative embodiment, the touch sensitive component is configured to perform a scroll function that includes a scroll-up operation and a scroll-down operation.

20 Claims, 3 Drawing Sheets

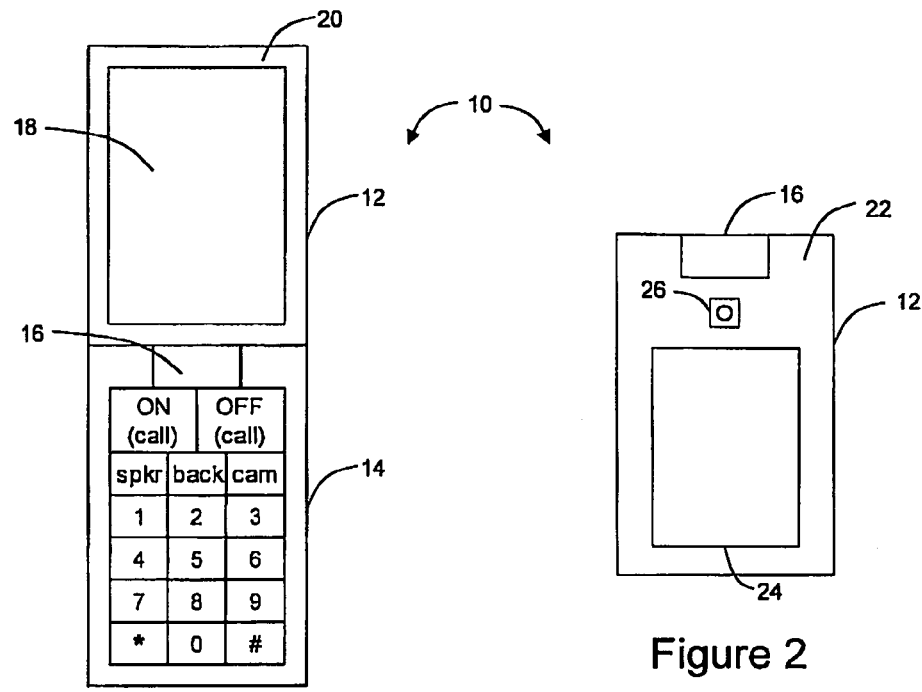
Figure 1
Figure 2
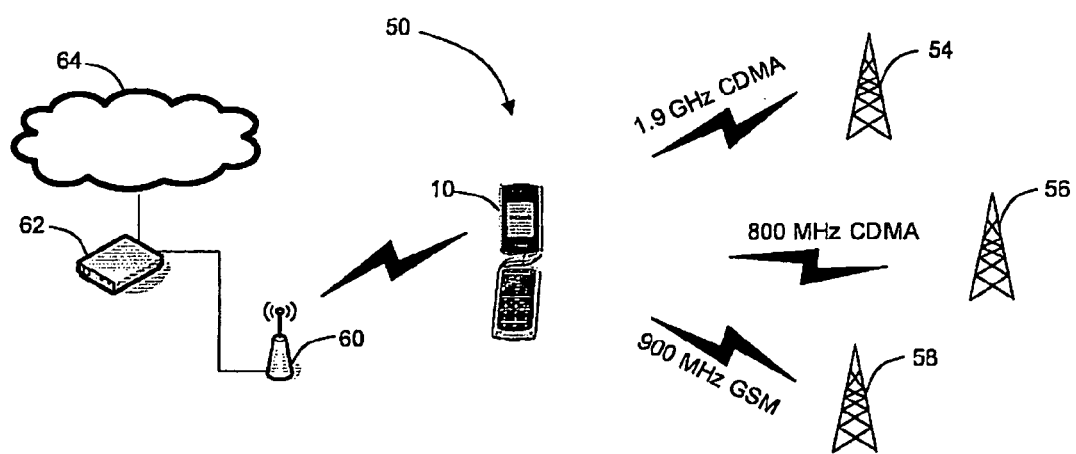
Figure 3

SCROLL WHEEL ON HINGE

FIELD OF THE INVENTION

The present invention relates to a scroll wheel hinge assembly for an electronic device. More particularly, the invention relates to a scroll wheel hinge assembly for a wireless communication device that pivotally connects a display housing member to a keypad housing member, wherein the scroll wheel hinge assembly includes a touch sensitive component that can be used in a closed position and an open position.

BACKGROUND

Consumers are increasingly demanding smaller feature rich wireless communication devices. One way to achieve a smaller cell phone with more functions and features is to produce a cell with two configurable housing portions. One such configuration is a flip phone that opens like a clam shell. Other configurations include sliding phones, in which one portion of the phone slides relative to another portion, and swivel phones, in which one portion of the phone swivels open in relation to the other portion of the phone.

Typically, a flip phone having a clam shell design includes a hinge. The hinge is a type of bearing that connects two solid objects and allows only a limited angle of rotation between them. Hinges are typically made of flexible materials or of moving components. Generally, the hinge in a flip phone is used to connect a keypad housing member to a display housing member. Sometimes the keypad section is operatively coupled to the display section using a flexible printed circuit board (PCB). Additionally, the keypad section of the wireless communication device may also be operatively coupled to the display section with a wire bundles or cables. For example, in a traditional flip phone having a "clamshell" design, the display housing member is pivotally attached to a keypad housing member. Generally, the hinge extends the entire length of the edges of the housing members and pivotally connects the housing members together.

Some of these flip phones have a side scroll wheel. Side scroll wheels are wheels that can be accessed from the side of a handset. These wheels can be accessed from side and can be used to scan through different data in the phone. For example, a clam shell or flip phone may have a scroll wheel on the side of the phone. When the scroll wheel is placed on the side of the flip phone, the side rotating motion does not semantically relate to the scroll function. Additionally, there is little or no space on the keypad to place a scroll wheel. Thus, although the existing side scroll wheel remains usable, the user experience could be improved by making the wheel more intuitive or simpler to use.

SUMMARY

A hinge assembly for an electronic device that pivotally connects a flip module to a base module having a keypad is described. The flip module has a front face with an internal display and a back face with an external display. In the first embodiment, the hinge assembly includes a cylindrical rotatable assembly having a free-wheel component. The cylindrical rotatable assembly is configured to enable the flip module to rotate in relation to the base module about a rotatable axis associated with the cylindrical rotatable assembly. The cylindrical rotatable assembly further comprises a free-wheel component on the exterior of the cylindrical assembly. The free-wheel component is configured to perform a scroll function that includes a scroll-up operation and a scroll-down operation. In a flip-closed position, where the flip module interfaces with the base module, a user interface (UI) displayed on the external display is controlled by the free-wheel component on the cylindrical rotatable assembly. In a flip-open position, in which the flip module is substantially separated from the base module and the keypad is accessible, the UI displayed on the internal display is also controlled by the free-wheel component associated with the hinge assembly.

In a second embodiment, a wireless communication device including a touch sensitive component associated with a cylindrical rotatable assembly. The wireless communication embodiment includes a flip module, a base module, a cylindrical rotatable assembly that receives scroll instructions from the associated touch sensitive component in the flip-open position and flip-closed position. The flip module has a front face with an internal display and a back face with an external display, wherein the internal display and external display are configured to present a user interface (UI). The base module has a keypad. The cylindrical rotatable assembly is configured to enable the flip module to rotate in relation to the base module about a rotatable axis associated with the cylindrical rotatable assembly. The cylindrical rotatable assembly also includes a touch sensitive component on the exterior of the cylindrical assembly that is configured to perform a scroll function that includes a scroll-up operation and a scroll-down operation. In a flip-closed position, the UI displayed on the external display is controlled by the touch sensitive component on the cylindrical rotatable assembly. In the flip-open position, the UI displayed on the internal display is also controlled by the touch sensitive component on the cylindrical rotatable assembly.

In a third embodiment, a hinge assembly associated with an electronic device is configured to receive navigation instructions. The hinge assembly comprises a rotatable assembly configured to enable the flip module to rotate in relation to the base module about a rotatable axis associated with the rotatable assembly. The rotatable assembly includes a touch sensitive component that receives a plurality of navigation instructions. The navigation instructions include a scrolling means, a zooming means, a panning means, and a selection means. The scrolling means performs a scroll function that includes a scroll-up operation and a scroll-down operation. The zooming means includes a zoom-in operation and a zoom-out operation. The panning means includes a pan-left operation and a pan-right operation. The selection means associated with the touch sensitive component acknowledges a selection associated with a user interface.

DRAWINGS

The present invention will be more fully understood by reference to the following drawings which are for illustrative, not limiting, purposes.

FIG. 1 shows an illustrative wireless handset in an open position.

FIG. 2 shows the illustrative wireless handset in a closed position.

FIG. 3 shows an illustrative communication system, in which the wireless communication device communicates using a variety of different standards.

DETAILED DESCRIPTION

Figure 4:
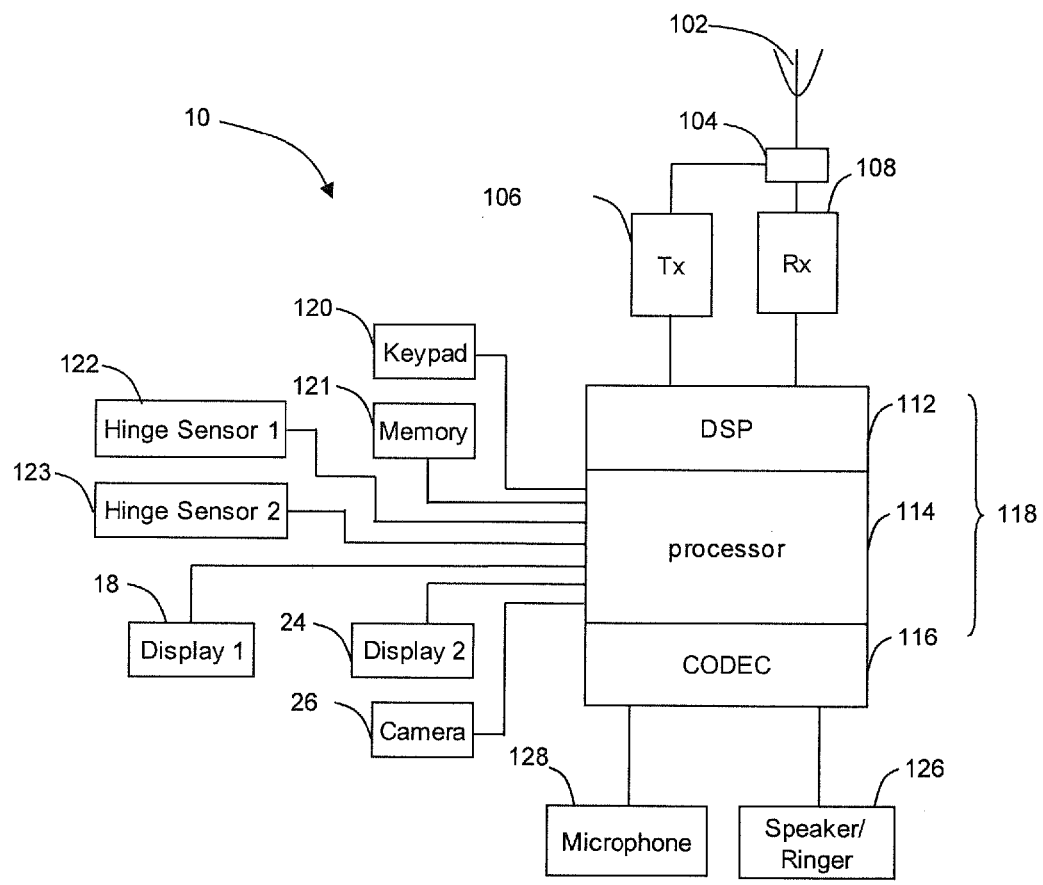
FIG. 4 shows a plurality of components associated with the illustrative wireless communication device.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the hinge assembly may vary as to details, the particulars of the rotation assembly, components or elements without departing from the illustrative hinge assembly disclosed herein.

A scroll wheel hinge assembly is described herewith. The scroll wheel hinge assemblies described may be applied to electronic devices that have a hinge component and a display component. For illustrative purposes, the embodiments presented herein are for a wireless communications device such as a clam shell phone, which is also referred to as a flip phone.

The clam shell phone has a flip module and a base module that are held together and rotated at the hinge. In the open position, the main "internal" display of the flip module and the keypad on the base module can be viewed and accessed. The illustrative flip module includes an internal display, an external display, a camera and a transceiver. The illustrative base module includes a battery, a keypad, one or more side keys, and connector input/output interfaces. The hinge provides a pivot between the base module and flip module and connects these two parts of the phone.

There are inter alia three scroll wheel on a hinge embodiments presented herein. In the first embodiment, the hinge assembly includes a free-wheel that can be rotated to scroll-up and scroll-down through user interfaces (UIs). Additionally, the free-wheel embodiments support zooming-in and zooming-out of images or web pages. In the free-wheel hinge embodiment, the wheel is placed in the middle portion of the mobile phone hinge. In this embodiment, the scroll wheel is just under the screen making the scroll wheel semantically more user-friendly and more intuitive to operate. Additionally, the cost of manufacturing may be reduced since the scroll wheel functions are integrated into the hinge, reducing the costs associated with a separate side scroll wheel.

In a second embodiment, the scroll wheel includes a touch sensitive component. The touch sensitive component may be a cylindrical capacitive key associated with the "scroll" wheel that when touched in a manner similar to a scroll wheel operates in a similar manner to the free-wheel embodiment described above. In the second touch sensitive scroll wheel embodiment, a static capacitive cylinder may be used as a substitute for the free-wheel embodiment.

In the third embodiment, the touch sensitive component operates in a manner similar to a navigation key. So the touch sensitive hinge "scroll" assembly can be used to perform operations such scroll-up, scroll-down, zoom-in, zoom-out, pan-left, pan-right, and the user can select or perform the enter function by tapping the touch sensitive component one or more times.

Referring to FIG. 1 there is shown a wireless handset in an open position with a hinge assembly that includes a free-wheel. The wireless communication device 10 includes a flip module or display housing member 12, a base module or keypad housing member 14, and a hinge assembly 16. In the illustrative embodiment, the display housing member 12 includes a first internal display 18 on the front face 20 of the flip module 12. The base module 14 includes input keys such as alphanumeric keys that can be used to input numbers or letters, and soft keys that perform functions displayed near the key, or other similar key arrangements.

The wireless handset is also configured to transition from the open position in FIG. 1 to the closed position in FIG. 2. The wireless communication device 10 transitions to the closed position by pivoting the flip module 12 and base module 14 relative to each other about the hinge assembly 16.

Referring to FIG. 2 there is shown the illustrative wireless handset in a closed position. In the closed position, the hinge assembly 16 and a back face 22 of the display housing member 12 is shown. The back face 22 of the display housing member 12 includes a second external display 24 and camera 26. In operation, the wireless communication device 10 is opened from the closed position by pivoting the display housing member 12 and keypad housing member 14 (shown in FIG. 1) relative to each other about the hinge assembly 16. By way of example and not of limitation, this opening step may activate the wireless communication device 10 or answer an incoming call.

The first internal display 18 is associated with the display housing member 12, which also referred to as the flip module. The internal display 18 is disposed on the front face 20 of the flip module 12. The second external display 24 is on the back face 22 of the display housing member 12. The second external display 24 would typically be smaller than the first internal display 18. Additionally, the second external display 24 is adjacent the camera 26 in the illustrative wireless communication device 10.

The internal display 18 and external display 24 may operate in single display mode or dual display mode. In a single display mode, both the internal display 18 and external display 24 present essentially the same UI. In a dual display mode, the internal display 18 UIs are substantially different from the external display 24 UIs. For example, the default UI in the open position may provide access to a home screen that displays a variety of different applications. However, in the closed position, the default UI may be a music-specific UI that presents song titles and other music related data fields. The hinge assembly described herein is adapted to operate in either single display mode or dual display mode.

In the first illustrative embodiment, the hinge assembly 16 includes a free-wheel that can be rotated to scroll-up, scroll-down, zoom-in, and zoom-out through user interfaces (UIs), images or web pages. In the free-wheel hinge embodiment, the free-wheel is associated with a cylindrical rotatable assembly in the middle portion of the hinge assembly 16 and a movable cylinder, i.e. the free-wheel, moves or is rotated by the user interacting with the free-wheel. In this embodiment, the free-wheel scroll wheel is just under the screen and makes the scroll wheel semantically more user-friendly and more intuitive to operate.

Referring now to FIG. 1 and FIG. 2, the unique position of the hinge makes it possible for the free-wheel to be accessible in both flip-open and flip-closed position. In a flip-closed position, the flip module 12 interfaces with the base module 14 and the UI displayed on the accessible external display 24 is controlled by the free-wheel component on the cylindrical rotatable assembly. In a flip-open position, the flip module 12 is substantially separated from the base module 14 and the accessible keypad and the UI displayed on the internal display 18 is also controlled by the free-wheel component.

Thus, because the free-wheel is on the hinge, it can be accessed in both flip-open and flip-closed positions and can be used to scroll through music files, video files, contacts, messages, e-mails and web pages. Additionally, the free-wheel can perform zoom-in and zoom-out functions for images, camera inputs, web pages, and other such viewing operations.

For example, the hinge scroll wheel can be used in the closed position where the wheel can be used to access music and scroll through music. In another illustrative example such as a dual display embodiment, the flip phone can be in a closed position and the user interface on the exterior display 24 presents the title and song. The hinge assembly 16 with the free-wheel may also be used to scroll through web pages, for web browsing, contacts, messages, e-mail and other such applications that employ the common side scroll wheel.

Additionally, the camera 26 may be configured to capture images that are presented on one of the displays 18 or 24. The free-wheel component is then configured to perform a zoom-in operation and a zoom-out operation for images or video captured by the camera 26.

Furthermore, the free-wheel component associated with hinge assembly 16 may be configured to perform a pan function that includes a pan-left operation and a pan-right operation. The pan-left and pan-right operations may be implemented by integrating a touch sensitive element into the free-wheel component as described in further detail below.

There are various types of touch sensors, including, but not limited to resistive touch sensors and capacitive touch sensors, including surface capacitive and projected capacitive touch sensors. As shown, a touch sensor overlay may be a capacitive overlay. Although described as a capacitive overlay, it should be appreciated that the touch sensor overlay may by any other suitable touch sensor.

Further still, the free-wheel component may be configured to perform a select function or enter function that includes acknowledging a selection associated with the UI. In the illustrative embodiment, the selection process may include receiving a tap or double tap on the touch sensitive component that is associated with the free-wheel component.

Further yet, the free-wheel component may operate as a navigation key function. In the navigation key embodiment, the moving free-wheel performs the zoom-in operation and a zoom-out operation and the scroll-up and scroll-down functions. The touch sensitive component associated with the hinge assembly supports the pan-left and pan-right operations, and the select function acknowledges a selection with one or more taps to the touch sensitive component.

Referring to FIG. 3 there is shown an illustrative communication system, in which the wireless communication device communicates using a variety of different standards. In the illustrative system 50, the wireless communication device 10 is a wireless handset that is configured to communicate with one or more base stations 54, 56 and 58 using different communication access technologies (CATs). The illustrative base stations may communicate with the wireless handset using a variety of different communication standards including, but not limited to, various forms of code division multiple access (CDMA), orthogonal frequency division multiple access (OFDMA), and time division multiple access (TDMA) wireless interfaces. By way of example and not of limitation, the wireless handset 10 communicates with base station 54 using a CAT that operates using CDMA technology at 1.9 GHz. The wireless handset 10 is also configured to communicate with base station 56 using a CAT that operates using CDMA at 800 MHz. Additionally, the illustrative handset 10 is configured to communicate with base station 58 using a CAT that operates using GSM technology at 900 MHz. The wireless handset 10 is also configured to monitor signals for a wireless local area network (WLAN) that may include a Wi-Fi access point 60 that is operatively coupled to a modem 62 that provides access to the Internet cloud 64.

The illustrative wireless communication device 10 is also referred to as a wireless handset, a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. Each CAT receiver module complies with a wireless standard having a receiver requirement. By way of example and not of limitation, the wireless standard is selected from the group of standards consisting of Code Division Multiple Access (CDMA), Global System for Mobile communications (GSM), Universal Mobile Telecommunications System (UMTS), Universal Mobile Broadband (UMB), wireless local area network (WLAN), wireless personal area network (WPAN), Mobile Broadband Wireless Access (MBWA) and Worldwide Interoperability for Microwave Access (WiMAX) or IEEE802.16. It shall be appreciated by those of ordinary skill in the art that the term wireless communication device, wireless handset, mobile handset, wireless phone, and mobile phone are interchangeable.

Referring to FIG. 4 there is shown a plurality of components associated with the illustrative wireless communication device. The illustrative multimode wireless handset 10 comprises a first antenna element 102 that is operatively coupled to a duplexer 104, which is operatively coupled to a multimode transmitter module 106, and a multimode receiver module 108. The antenna element 102 may be mounted on the display housing element 12, the keypad housing element 14, or a combination thereof.

An illustrative control module 118 comprises a digital signal processor (DSP) 112, a processor 114, and a CODEC 116 that are communicatively coupled to the transmitter 106 and receiver 108. It shall be appreciated by those of ordinary skill in the art that the transmitter module and receiver module are typically paired and may be embodied as a transceiver.

The illustrative transmitter 106, receiver 108, or transceiver may be housed in the display housing member 12, the keypad housing member 14, or a combination thereof. The illustrative transmitter 106, receiver 108, or transceiver is operatively coupled to antenna element 102.

The DSP 112 may be configured to perform a variety of operations such as controlling the antenna 102, the multimode transmitter module 106, and the multimode receiver module 108.

The processor 114 is operatively coupled to a keypad 120 associated with the keypad housing member 14, a memory 121, a first hinge sensor 122, a second hinge sensor 123, a first internal display 18, a second external display 24, and the camera 26. Additionally, the processor 112 is also operatively coupled to the CODEC module 114 that performs the encoding and decoding operations and is communicatively coupled to a speaker or ringer 126, and a microphone 128. The CODEC module 114 is also communicatively coupled to the display 124 and provides the encoding and decoding operations for video.

By way of example and not of limitation, the first hinge sensor 122 is associated with the hinge assembly described above and receives user input associated with illustrative hinge assembly 16 that includes a free-wheel that can be rotated to perform the scroll-up, scroll-down, zoom-in, and zoom-out operations. In the illustrative free-wheel hinge embodiment, the free-wheel is associated with a movable cylinder that moves or is rotated by the user interacting with the free-wheel.

The illustrative second hinge sensor 123 is associated with the touch sensitive component that performs can pan-left, pan-right, and the select tap functions. As previously indicated, there are various types of touch sensors, including, but not limited to resistive touch sensors and capacitive touch sensors, including surface capacitive and projected capacitive touch sensors. In the illustrative embodiment, the touch sensor overlay may be a capacitive overlay.

Thus, in the first embodiment the touch sensitive component performs operations associated with pan-left, pan-right, and the select or enter function. In the second embodiment described below, the touch sensitive component also performs the scroll-up, scroll-down, zoom-in, and zoom-out operations. In the third navigation key embodiment, the hinge sensor 123 is configured to receive navigation key instructions such as left, right, up, down, and select, as described in further detail below.

Figure 5:
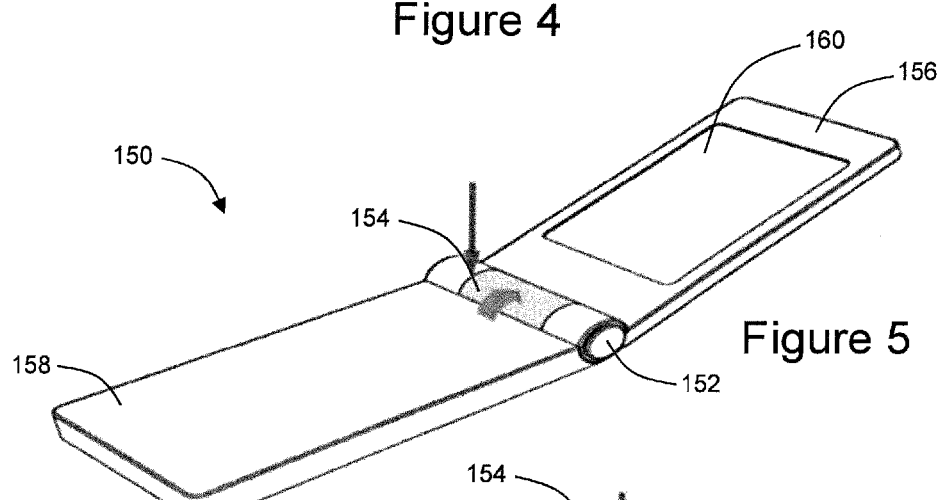
FIG. 5 shows an illustrative embodiment of the scroll wheel on a hinge assembly in the open position.
Figure 6:
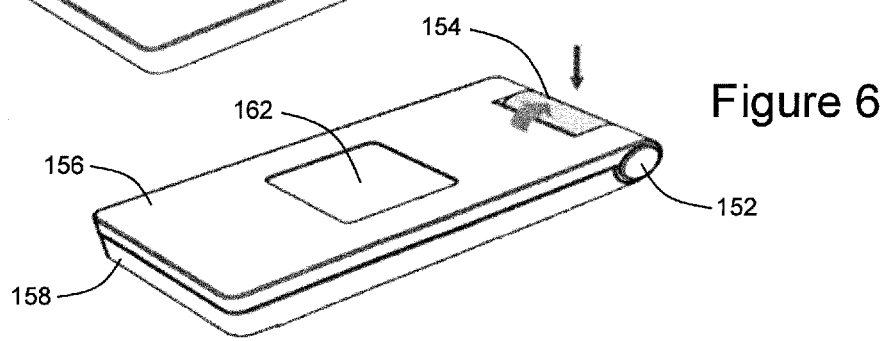
FIG. 6 shows the illustrative scroll wheel on a hinge assembly in the closed position.

In second illustrative embodiment 150, the hinge assembly 152 includes the touch sensitive component 154 as shown FIG. 5 and FIG. 6. The touch sensitive component does not include the free-wheel described above. Instead, the touch sensitive component is static such as a resistive touch sensor or a capacitive touch sensor, including surface capacitive and projected capacitive touch sensors. A touch sensor overlay may also be a capacitive overlay or any other suitable touch sensor. In this illustrative embodiment, the wireless communication device 150 comprises a flip module 156, a base module 158 and the touch sensitive component 154. In the illustrative embodiment 150, the touch sensitive component 154 is located on the exterior of the cylindrical hinge assembly 152.

In FIG. 5, the illustrative touch sensitive component 154 on the hinge assembly 152 is in the open position and the flip module 156 is substantially separated from the base module 158. The internal display 160 is visible in the open position and the displayed UI can be controlled by the touch sensitive component 154.

In FIG. 6, the illustrative touch sensitive component 154 is in the closed position and the flip module 156 interfaces with the base module 158. In the closed position, the external display 162 is shown and the external UI can also be controlled by the touch sensitive component 154.

With respect to captured images or web pages and other such visual content, when an image is captured and displayed on either display 160 or 162, the touch sensitive component 154 may be configured to perform a zoom function that includes a zoom-in operation and a zoom-out operation. Additionally, the touch sensitive component 154 may be configured to perform a scrolling function that includes a scroll-up operation and a scroll-down operation. Furthermore, the touch sensitive component 154 may also be configured to perform a pan function that includes a pan-left operation and a pan-right operation. Further still, the touch sensitive component 154 may also be configured to perform a select function that includes acknowledging a selection by receiving one or more taps on the touch sensitive component.

The touch sensitive component 154 may also operate as a navigation key and provide an integrated function key that includes the zoom function, the scrolling function, the pan function, and the select function.

Figure 7:
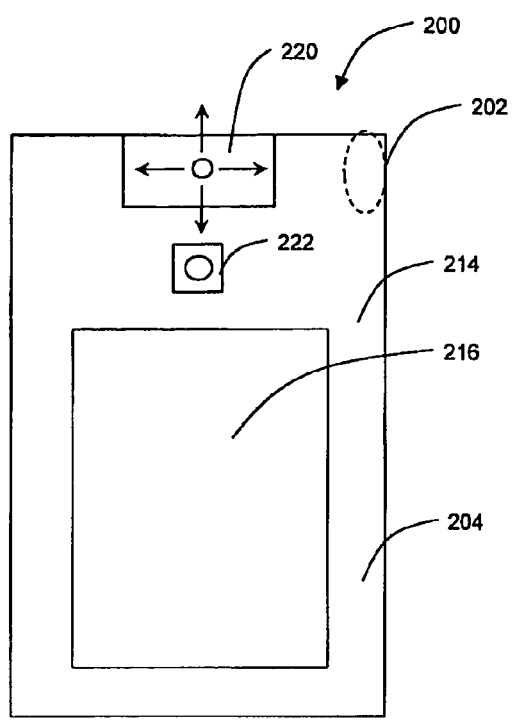
FIG. 7 shows an illustrative embodiment of a navigation wheel on a hinge assembly in the closed position.
Figure 8:
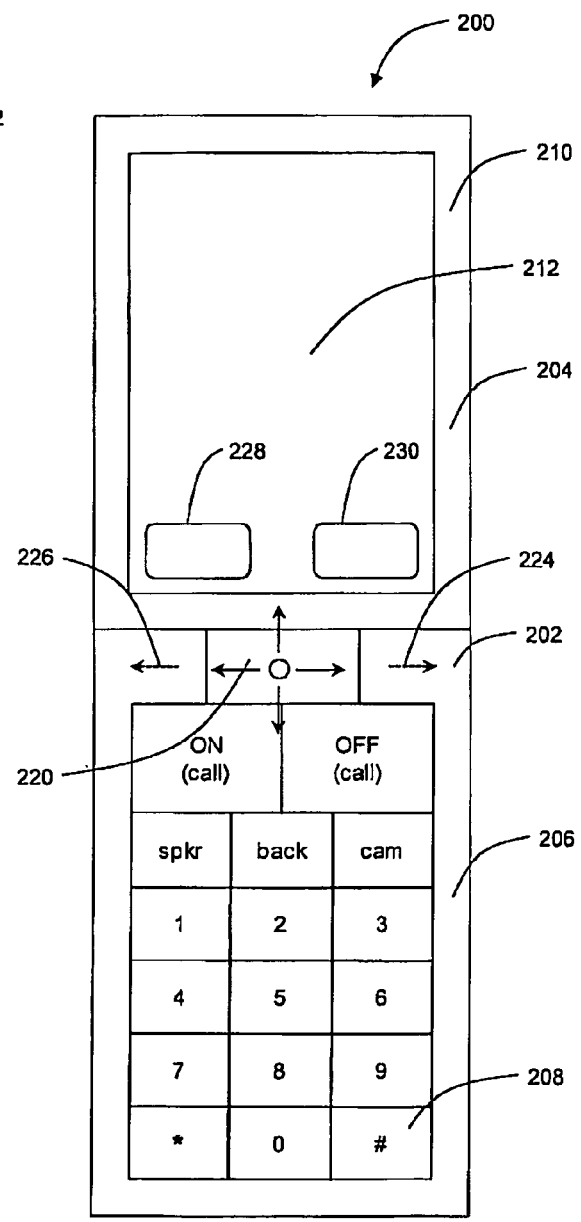
FIG. 8 shows an illustrative embodiment of the navigation wheel on the hinge assembly in the open position.

Referring to FIG. 7 and FIG. 8, there is shown a third illustrative embodiment 200 of a navigation hinge assembly 202 that performs the operations of a navigation key. In FIG. 7, the navigation hinge assembly is presented in the closed position and in FIG. 8 the navigation hinge assembly is presented in the open position.

Navigation keys are a type of function key frequently used to spatially navigate through mobile UIs and menu trees. These keys provide the ability to move up, down, left, or right within a menu, or to move a cursor within text or a numeric display. Navigation keys are typically located on the side of the mobile handset housing away from the main keypad, or they may comprise individual keys on the main keypad. They navigation keys are usually identified with arrows that provide directional cursor control or menu control. The up and down navigation keys are often used to move within menu options. Once the user has navigated to the desired location within a menu, an option is selected with an enter key. Sometimes, left and right navigation keys are used to move in the up, down, left, and right directions within menu options, to move the cursor on a display. Additionally, the left navigation key is also often used to delete incorrect data entry.

In the illustrative embodiment 200 presented in FIG. 7 and FIG. 8, the hinge assembly 202 pivotally connects a flip module 204 with a base module 206 having a keypad 208. The flip module 204 has a front face 210 with an internal display 212 and a back face 214 with an external display 216. The hinge assembly 202 includes a rotatable assembly configured to enable the flip module 204 to rotate in relation to the base module 206 about a rotatable axis associated with the rotatable assembly. Additionally, a camera 222 configured to capture images presented on the internal display 212 and external display 216 is presented.

In the illustrative embodiment, the hinge assembly 202 includes a touch sensitive component configured to receive a plurality of navigation instruction that include a scrolling means, a zooming means, a panning means, and a selection means. The scrolling means performs a scroll function that includes a scroll-up operation and a scroll-down operation. The zooming means includes a zoom-in operation and a zoom-out operation. The panning means includes a pan-left operation and a pan-right operation. The selection means receives a selection or enter instruction similar to a navigation key.

Thus, the touch sensitive component 220 associated with hinge assembly 202 operates as a navigation key by receiving touch sensitive instruction from a thumb or finger. For example, the up/down operations associated with zooming means and scrolling means can be performed by receiving a vertical motion instruction on the touch sensitive component. The panning means mimic the left/right operations and a horizontal motion instruction is received by the touch sensitive component 220. The selection means generally involves pushing down one or more times, i.e. tapping, on the touch sensitive component. These operations performed by the touch sensitive component 220 are similar to a navigation key having a center selection key that is surrounded by an up arrow key, down arrow key, left arrow key, and right arrow key.

Referring to FIG. 8 there is also shown one or more pressure switches located on the hinge assembly 202 that can be used for soft key emulation. The hinge assembly 202 in FIG. 8 includes the first touch sensitive component 220 that operates as a navigation key and two additional touch sensitive keys 224 and 226 located on each side of the first touch sensitive component 220. The second touch sensitive component 224 is located to the right of the central touch sensitive component 220. The third touch sensitive component 226 is located to the left of the central touch sensitive component 220.

In the soft key embodiment presented in FIG. 8, the left-side touch sensitive component 226 may be associated with a first switch that corresponds to a particular soft key operation 228 shown on display 212. The central touch sensitive key 220 may then operate as the OK key. The right-side touch sensitive component 224 can then be associated with a second switch that corresponds to another soft key operation 230. Alternatively, the left touch sensitive component 226 may operate a left-arrow key, and the right touch sensitive component 224 may operate as a right-arrow key.

In the various embodiments described above, the touch sensitive components described can operate as mechanical elements that are adapted to move spatially such as switches, physical keys, free-wheels, and other such mechanical elements. Additionally, the touch sensitive component includes static elements that do not move but are adapted to receive instructions such as a touch sensitive component with a capacitive overlay.

It is to be understood that the detailed description of illustrative embodiments are provided for illustrative purposes. The scope of the claims is not limited to these specific embodiments or examples. For example, a scroll wheel hinge assembly is described, however this solution may be extended to other hinge assemblies that are implement with the wireless communication devices or other electronic devices that have a hinge component and a display component. Therefore, various structural limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A hinge assembly for an electronic device that pivotally connects a flip module to a base module with a keypad, wherein the flip module has a front face with an internal display and a back face with an external display, the hinge assembly comprising:
    a cylindrical rotatable assembly configured to enable the flip module to rotate in relation to the base module about a rotatable axis associated with the cylindrical rotatable assembly, the cylindrical rotatable assembly further comprising,
        a free-wheel component on the exterior of the cylindrical assembly, wherein the free-wheel component is configured to perform a scroll function that includes a scroll-up operation and a scroll-down operation;
    a flip-closed position, in which the flip module interfaces with the base module, wherein a user interface (UI) displayed on the external display is controlled by the free-wheel component on the cylindrical rotatable assembly; and
    a flip-open position, in which the flip module is substantially separated from the base module and the keypad is accessible, wherein the UI displayed on the internal display is controlled by the free-wheel component on the cylindrical rotatable assembly.

2. The hinge assembly of claim 1 wherein the free-wheel component further comprises a cylinder configured to rotate along the rotatable axis, wherein the movable cylinder controls the UI.

3. The hinge assembly of claim 1 wherein the free-wheel component further comprises a mechanical free wheel configured to receive a rotatable instruction, wherein the rotatable instruction controls the UI.

4. The hinge assembly of claim 1 wherein the electronic device further comprises a camera configured to capture an image presented on one of the displays, wherein the free-wheel component is configured to perform a zoom function that includes a zoom-in operation and a zoom-out operation.

5. The hinge assembly of claim 1 wherein the free-wheel component is configured to perform a pan function that includes a pan-left operation and a pan-right operation.

6. The hinge assembly of claim 1 wherein the free-wheel component is configured to perform a select function that includes acknowledging a selection associated with the UI.

7. The hinge assembly of claim 1 wherein the free-wheel component further comprises a navigation key function that includes,
    a zoom function that includes a zoom-in operation and a zoom-out operation,
    a pan function that includes a pan-left operation and a pan-right operation, and
    a select function that includes acknowledging a selection associated with the UI.

8. A wireless communication device comprising:
    a flip module having a front face with an internal display and a back face with an external display, wherein the internal display and external display are configured to present a user interface (UI);
    a base module having a keypad;
    a cylindrical rotatable assembly configured to enable the flip module to rotate in relation to the base module about a rotatable axis associated with the cylindrical rotatable assembly, the cylindrical rotatable assembly further comprising,
        a touch sensitive component on the exterior of the cylindrical assembly, wherein the touch sensitive component is configured to perform a scroll function that includes a scroll-up operation and a scroll-down operation;
    a flip-closed position, in which the flip module interfaces with the base module, wherein the UI displayed on the external display is controlled by the touch sensitive component on the cylindrical rotatable assembly; and
    a flip-open position, in which the flip module is substantially separated from the base module and the keypad is accessible, wherein the UI displayed on the internal display is controlled by the touch sensitive component on the cylindrical rotatable assembly.

9. The wireless communication device of claim 8 wherein the touch sensitive component further comprises a touch sensitive cylinder configured to rotate along the rotatable axis, wherein the movable cylinder controls the UI.

10. The wireless communication device of claim 8 wherein the touch sensitive component further comprises a static cylinder with a capacitive overlay configured to receive a touch sensitive rotatable instruction, wherein the rotatable instruction controls the UI.

11. The wireless communication device of claim 8 further comprising a camera configured to capture an image presented on one of the displays, wherein the touch sensitive component is configured to perform a zoom function that includes a zoom-in operation and a zoom-out operation.

12. The wireless communication device of claim 8 wherein the touch sensitive component is configured to perform a pan function that includes a pan-left operation and a pan-right operation.

13. The wireless communication device of claim 8 wherein the touch sensitive component is configured to perform a select function that includes acknowledging a selection associated with the UI.

14. The wireless communication device of claim 8 wherein the touch sensitive component further comprises a navigation key function that includes,
    a zoom function that includes a zoom-in operation and a zoom-out operation, a pan function that includes a pan-left operation and a pan-right operation, and a select function that includes acknowledging a selection associated with the UI.

15. A hinge assembly for an electronic device that pivotally connects a flip module to a base module having a keypad, wherein the flip module has a front face with an internal display and a back face with an external display, the hinge assembly comprising:

a rotatable assembly configured to enable the flip module to rotate in relation to the base module about a rotatable axis associated with the rotatable assembly, the rotatable assembly includes a touch sensitive component that receives a plurality of navigation instructions comprising, a scrolling means, on the assembly associated with the touch sensitive component, wherein the scrolling means performs a scroll function that includes a scroll-up operation and a scroll-down operation, a zooming means, on the assembly associated with the touch sensitive component, wherein the zooming means includes a zoom-in operation and a zoom-out operation, a panning means associated with the touch sensitive component, that includes a pan-left operation and a pan-right operation, and a selection means associated with the touch sensitive component, that includes acknowledging a selection associated with a user interface (UI);

a flip-closed position, in which the flip module interfaces with the base module, wherein the UI displayed on the accessible external display is controlled by the touch sensitive component on the rotatable assembly; and a flip-open position, in which the flip module is substantially separated from the base module and the keypad is accessible, wherein the UI displayed on the internal display is controlled by the touch sensitive component on the rotatable assembly.

16. The hinge assembly of claim 15 wherein the rotatable assembly further comprises a mechanical element configured to rotate along the rotatable axis, wherein the movable element controls the UI.

17. The hinge assembly of claim 15 wherein the rotatable assembly further comprises a static element configured to receive an instruction that controls the UI.

18. The hinge assembly of claim 15 wherein the electronic device further comprises a camera configured to capture an image presented on one of the displays and controlled by the rotatable assembly.

19. The hinge assembly of claim 15 wherein the electronic device further comprising a plurality of music files stored in a memory, wherein the plurality of music titles are presented on the external display.

20. The hinge assembly of claim 19 wherein received navigation instructions are configured to select music titles presented on the external display.

* * * * *